United States Patent
Garrity et al.

(10) Patent No.: US 11,582,948 B2
(45) Date of Patent: Feb. 21, 2023

(54) CATTLE TRACKING SYSTEM

(71) Applicant: Garrity Power Services LLC, Rockwall, TX (US)

(72) Inventors: Paul Garrity, Rockwall, TX (US); Aaron Jungreis, Ra'anana (IL); Angus Lu, Rockwall, TX (US)

(73) Assignee: Garrity Power Services LLC, Rockwall, TX (US)

( * ) Notice: Subject to any disclaimer, the term of this patent is extended or adjusted under 35 U.S.C. 154(b) by 0 days.

(21) Appl. No.: 17/379,353

(22) Filed: Jul. 19, 2021

(65) Prior Publication Data
US 2022/0022419 A1   Jan. 27, 2022

Related U.S. Application Data (60) Provisional application No. 63/054,396, filed on Jul. 21, 2020.

(51) Int. Cl.
*G08B 23/00* (2006.01)
*A01K 11/00* (2006.01)
(Continued)

(52) U.S. Cl.
CPC .......... *A01K 11/004* (2013.01); *A01K 11/008* (2013.01); *A01K 29/005* (2013.01);
(Continued)

(58) Field of Classification Search
CPC .. A01K 11/004; A01K 11/008; A01K 29/005; H04B 17/318; G06K 7/10405;
(Continued)

(56) References Cited

U.S. PATENT DOCUMENTS

| | | | | |
|---|---|---|---|---|
| 4,274,083 A | * | 6/1981 | Tomoeda | G06K 7/0008 |
| | | | | 119/51.02 |
| 4,918,425 A | * | 4/1990 | Greenberg | G08B 21/0297 |
| | | | | 340/572.1 |

(Continued)

OTHER PUBLICATIONS

Petersen et al., Water temperature impacts water consumption by range cattle in winter (Year: 2016).*

(Continued)

*Primary Examiner* — Quang Pham
(74) *Attorney, Agent, or Firm* — Hovey Williams LLP; Scott R. Brown (57) ABSTRACT

An animal tracking system comprising a first LoRa receiver configured as a gateway to receive transmissions on a first set of channels or a second set of channels and forward said transmissions to a first remote server, and a transmitting tag configured to be affixed to an animal. The transmitting tag includes a memory configured to store digital information, a passive RFID receiver configured to detect a close proximity to an RFID transmitter and store detection of the close proximity in comprising in the memory, a processor configured to determine an alarm status according to a frequency of detection of the close proximity, an internal energy source, and a LoRa transmitter configured to transmit signals for a distance greater than 100 meters via energy from the internal energy source.

20 Claims, 5 Drawing Sheets

(51) Int. Cl.
  *A01K 29/00* (2006.01)
  *H04B 17/318* (2015.01)
  *G06K 19/07* (2006.01)
  *G06K 19/077* (2006.01)
  *G06K 7/10* (2006.01)

(52) U.S. Cl.
  CPC ..... *G06K 7/10405* (2013.01); *G06K 19/0717* (2013.01); *G06K 19/0723* (2013.01); *G06K 19/07705* (2013.01); *H04B 17/318* (2015.01)

(58) Field of Classification Search
  CPC ........... G06K 19/0717; G06K 19/0723; G06K 19/07705
  See application file for complete search history.

(56) References Cited

U.S. PATENT DOCUMENTS

| Patent/Pub No. | Date | Name | Class |
|---|---|---|---|
| 6,202,594 B1* | 3/2001 | Kirschner | A01K 7/02 119/72 |
| 6,445,296 B1* | 9/2002 | Sadler | A01K 29/005 343/742 |
| 6,850,151 B1* | 2/2005 | Calhoun | G04G 15/00 340/7.61 |
| 7,026,939 B2* | 4/2006 | Letkomiller | A01K 11/006 340/573.3 |
| 7,705,736 B1* | 4/2010 | Kedziora | A01K 27/009 340/573.3 |
| 8,120,461 B2* | 2/2012 | Zimmerman | H04B 5/02 340/10.5 |
| 8,659,429 B1* | 2/2014 | Wagner | G01S 13/876 340/572.1 |
| 8,941,496 B2* | 1/2015 | Batra | G06K 19/07749 340/572.1 |
| 9,760,853 B2* | 9/2017 | Rose | G01S 5/02 |
| 9,826,714 B2 | 11/2017 | Garrity | |
| 10,104,871 B2* | 10/2018 | Triener | G01G 17/08 |
| 10,194,276 B1* | 1/2019 | Singamsetty | H04L 67/566 |
| 10,317,247 B1* | 6/2019 | Wernlund | H01H 36/0013 |
| 10,455,816 B2* | 10/2019 | Duan | A01K 29/005 |
| 2004/0049451 A1* | 3/2004 | Berardi | G06Q 20/327 705/39 |
| 2005/0046580 A1* | 3/2005 | Miranda-Knapp | G08B 25/08 340/686.1 |
| 2005/0237157 A1* | 10/2005 | Cooper | G06K 7/10049 340/10.2 |
| 2005/0237158 A1* | 10/2005 | Cooper | G06K 7/0008 340/10.2 |
| 2006/0019679 A1* | 1/2006 | Rappaport | G01S 5/02521 455/456.1 |
| 2006/0249088 A1* | 11/2006 | Eu | A01K 5/0142 119/51.02 |
| 2006/0252366 A1* | 11/2006 | Eu | E06B 7/32 455/3.06 |
| 2007/0077888 A1* | 4/2007 | Forster | G06K 7/10079 455/41.2 |
| 2007/0109124 A1* | 5/2007 | Park | G07F 7/08 713/168 |
| 2010/0110948 A1* | 5/2010 | Batta | H04W 52/0235 370/311 |
| 2010/0162960 A1* | 7/2010 | Moon | A01K 29/00 119/51.02 |
| 2011/0148639 A1* | 6/2011 | Geissler | A01K 29/005 340/573.1 |
| 2011/0166793 A1* | 7/2011 | March | A61D 17/002 702/19 |
| 2011/0294515 A1* | 12/2011 | Chen | H04W 64/00 455/456.1 |
| 2012/0062381 A1* | 3/2012 | Liu | G01S 11/06 340/572.1 |
| 2012/0201277 A1* | 8/2012 | Tanner | G06Q 10/08 375/141 |
| 2012/0268035 A1* | 10/2012 | Stanley | H05B 47/185 315/307 |
| 2012/0277550 A1* | 11/2012 | Rosenkranz | A01K 11/007 600/302 |
| 2013/0138389 A1* | 5/2013 | Gyongy | A61B 5/1118 702/141 |
| 2013/0162402 A1* | 6/2013 | Amann | G06K 7/10009 340/10.1 |
| 2013/0176125 A1* | 7/2013 | Beck | G16H 40/67 340/573.1 |
| 2013/0279547 A1* | 10/2013 | Jonsson | H04B 1/7115 375/147 |
| 2014/0015644 A1* | 1/2014 | Amann | G06F 16/00 340/10.1 |
| 2014/0263389 A1* | 9/2014 | Perozek | A61J 7/02 221/7 |
| 2015/0163412 A1* | 6/2015 | Holley | G08B 25/008 348/143 |
| 2015/0282457 A1* | 10/2015 | Yarden | A61D 17/002 340/573.2 |
| 2015/0320535 A1* | 11/2015 | Driver | G01G 17/08 177/1 |
| 2015/0351369 A1* | 12/2015 | Frazier | A61D 17/00 340/573.2 |
| 2015/0379850 A1* | 12/2015 | Wong | A61B 90/90 340/539.13 |
| 2016/0165851 A1* | 6/2016 | Harty | A61D 17/002 600/595 |
| 2017/0042119 A1* | 2/2017 | Garrity | G01S 5/0294 |
| 2017/0049545 A1* | 2/2017 | Carton | A01K 7/02 |
| 2017/0201400 A1* | 7/2017 | Park | H04L 27/14 |
| 2018/0020643 A1* | 1/2018 | Duan | A01K 29/005 340/573.3 |
| 2018/0103321 A1* | 4/2018 | Seo | H04R 1/1091 |
| 2018/0146645 A1* | 5/2018 | Arbel | A01K 11/006 |
| 2018/0160649 A1* | 6/2018 | Hicks | A01K 7/02 |
| 2018/0206455 A1* | 7/2018 | Thiex | A01K 11/008 |
| 2018/0325382 A1* | 11/2018 | Brandao | A01K 29/005 |
| 2018/0333244 A1* | 11/2018 | Hanks | A61D 17/00 |
| 2018/0364361 A1* | 12/2018 | Liu | G01S 19/30 |
| 2019/0069185 A1* | 2/2019 | Sinha | H04W 16/18 |
| 2019/0166695 A1* | 5/2019 | Bae | G01S 5/14 |
| 2019/0197853 A1* | 6/2019 | Trivelpiece | G06K 19/0723 |
| 2019/0297493 A1* | 9/2019 | Jeong | H04L 9/088 |
| 2019/0318356 A1* | 10/2019 | Martin | H04L 9/0637 |
| 2019/0334879 A1* | 10/2019 | Lerner | H04L 9/12 |
| 2019/0380311 A1* | 12/2019 | Crouthamel | A01K 29/005 |
| 2020/0100460 A1* | 4/2020 | Chen | A01K 5/0225 |
| 2020/0228329 A1* | 7/2020 | Lee | H04L 9/0861 |
| 2020/0323170 A1* | 10/2020 | Garigan | A01K 27/009 |
| 2020/0344170 A1* | 10/2020 | Ochi | H04L 9/08 |
| 2021/0050997 A1* | 2/2021 | Nakatsuru | H04L 9/3247 |
| 2021/0105255 A1* | 4/2021 | Iriyama | H04L 9/008 |
| 2021/0289746 A1* | 9/2021 | Villalobos | A01K 29/005 |
| 2022/0104929 A1* | 4/2022 | Cummins | A61D 17/002 |

OTHER PUBLICATIONS

Barge et al., Radio frequency identification technologies for livestock management and meat supply chain traceability (Year: 2013).*

Roge, How to Use RFID Technology for Cattle Tracking—WXR (Year: 2020).*

Scott et al., Using an active Radio Frequency Identification Real-Time Location System to remotely monitor animal movement in zoos (Year: 2016).*

* cited by examiner

CATTLE TRACKING SYSTEM

RELATED APPLICATIONS

This regular utility patent application claims priority benefit with regard to all common subject matter of earlier-filed U.S. Provisional Patent Application Ser. No. 63/054,396, filed on Jul. 21, 2020, and titled "Cattle Tracking System". The identified earlier-filed provisional patent application is hereby incorporated by reference in its entirety into the present application.

BACKGROUND

Cattle ranches may contain a very large number of animals, sometimes in the tens of thousands for a single ranch. While raising cattle for beef production, a significant percentage (e.g., 6% to 7%) of these animals often become sick and are unable to be used for meat.

Some ranches electronically monitor the animals for signs of sickness to aid recovery and increase yield, but most ranches present many obstacles to setting up electronic monitoring of animals. Due to risk of electrocution, most ranches contain little or no high voltage electric lines anywhere in the vicinity where animals may roam. Furthermore, the large physical size of the ranch makes it difficult to transmit signal information from each animal to an information gathering location to send the signal information to an internet-based server.

In the past decade, passive Radio Frequency Identification (RFID) began to be used in tagging cattle. Passive RFID involves sending small amounts of energy as well as signals to a device in close proximity to the transmitter. The transmitted energy provides enough power for the RFID tag to process information and to send back a signal to the transmitter, thus providing an identification of the device that contains the RFID tag. Unfortunately, passive RFID tags are only powered when in close proximity to the transmitter (which occurs only a small fraction of each day), so the use of passive RFID in cattle tracking requires that the cattle come very close to (within a few meters of) the transmitter. Pure passive RFID tags cannot transmit positional information when the animal is not adjacent to an RFID transmitter.

In order to obviate the need for bringing a transmitter near the animal or getting all of the animals to come near a transmitter, tags that can transmit over very long distances would be required. This has not heretofore been implemented due to several unresolved obstacles. One obstacle is that the transmission of traditional long-range wireless signals over a long distance requires substantial amounts of energy. A large battery is required to provide energy for this type of transmission. The battery weight would cause discomfort for the animal, especially when used in an ear tag. Another obstacle is that quiescent current required by a traditional long-range wireless solution is relatively high, thus causing a battery to become quickly drained. Another obstacle is the need for frequent battery replacements. Another obstacle is the battery drain that occurs from continuously-operated sensors used to record information about the animal.

Yet another obstacle is the inherent cost in setting up multiple receivers that can measure signal strength of transmitted signals in addition to being able to process information from tens of thousands of animals when trying to determine animal position through trilateration.

SUMMARY

These and other problems are generally solved or circumvented, and technical advantages are generally achieved, by advantageous embodiments of the present invention. An embodiment of the invention is a tracking system comprising a first LoRa (long range) receiver and a transmitting tag. The LoRa receiver is configured as a gateway to receive transmissions on a first set of channels or a second set of channels and forward said transmissions to a first remote server.

The transmitting tag is configured to be affixed to an animal and includes a memory, a first passive RFID receiver, a processor, an internal energy source, and a LoRa transceiver. The memory is configured to store digital information. The first passive RFID receiver is configured to detect a first close proximity to a designated first RFID transmitter and store detection of the first close proximity in the memory.

The processor is configured to determine an alarm status according to the frequency of detection of the first close proximity. To that end, the processor may compare the frequency of detection of the first close proximity to older values of the frequency of detection of the first close proximity. The processor may also be configured to determine an alarm status by comparing a quantity of motion of the animal to older values of the quantity of motion.

The internal energy source comprises a battery or a photovoltaic cell. Other energy sources such as electromechanical energy harvesters may be used.

The LoRa transceiver (a transmitter and receiver combination) is configured to transmit signals for a distance greater than 100 meters via power received from the internal energy source. Alternatively, a LoRa transmitter may be used.

The first RFID transmitter may be part of an animal watering apparatus and is configured to awaken the first passive RFID receiver when the animal is close enough to drink water from the animal watering apparatus so that the first passive RFID receiver stores detection of the first close proximity to the animal watering apparatus in the memory of the transmitting tag.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

For a more complete understanding of the present invention, reference is now made to the following descriptions taken in conjunction with the accompanying drawings, in which.

Corresponding numerals and symbols in the different FIGUREs generally refer to corresponding parts unless otherwise indicated and may not be redescribed in the interest of brevity after the first instance. The FIGUREs are drawn to illustrate the relevant aspects of exemplary embodiments.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

It should be noted that in the subsequent discussions, the term "sleep mode" will be used in reference to several electronic components. In these discussions, "sleep mode" refers to an operating mode in which an electronic component goes into a low power state. In the low power state, the component consumes less than 10 microamps of current and is unable to perform most operations—however, the component is capable of "waking" from the sleep mode due to an input voltage reaching a threshold or to a built-in timer reaching a predetermined time.

Figure 1:
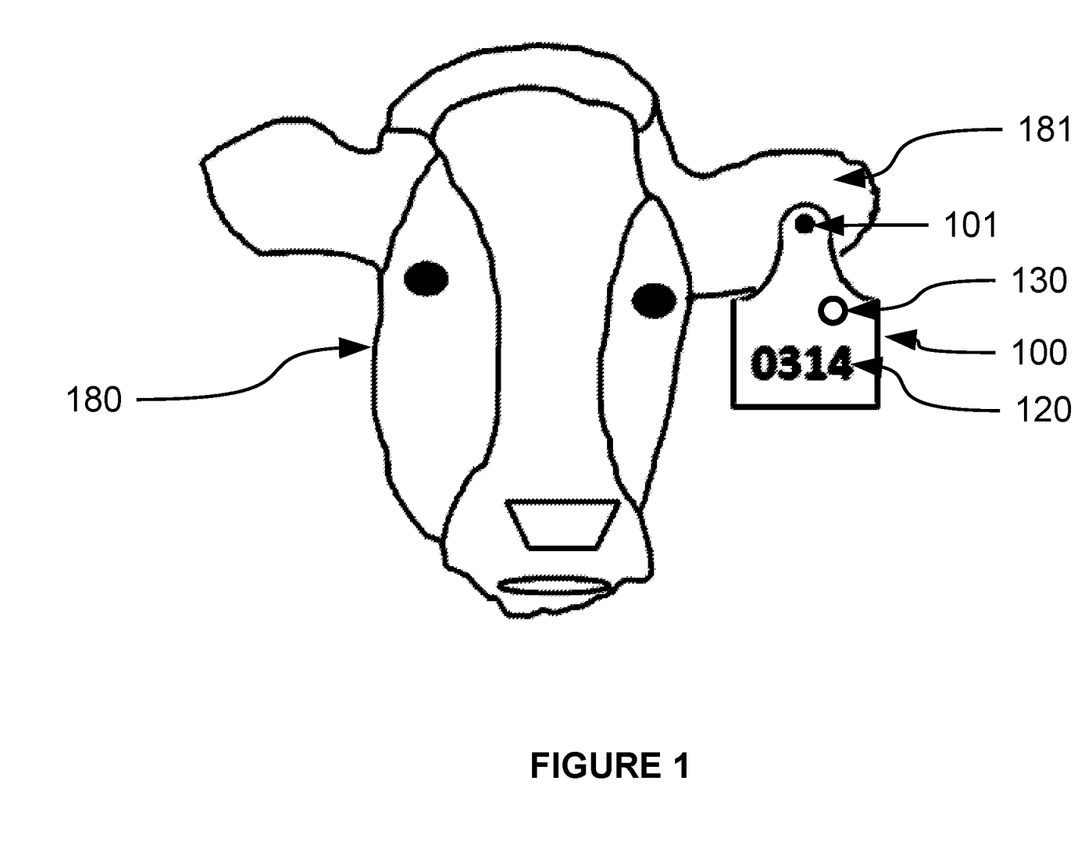
FIG. 1 illustrates an environmental view of a transmitting tag affixed to an animal and constructed in accordance with an embodiment of the invention.
Figure 2:
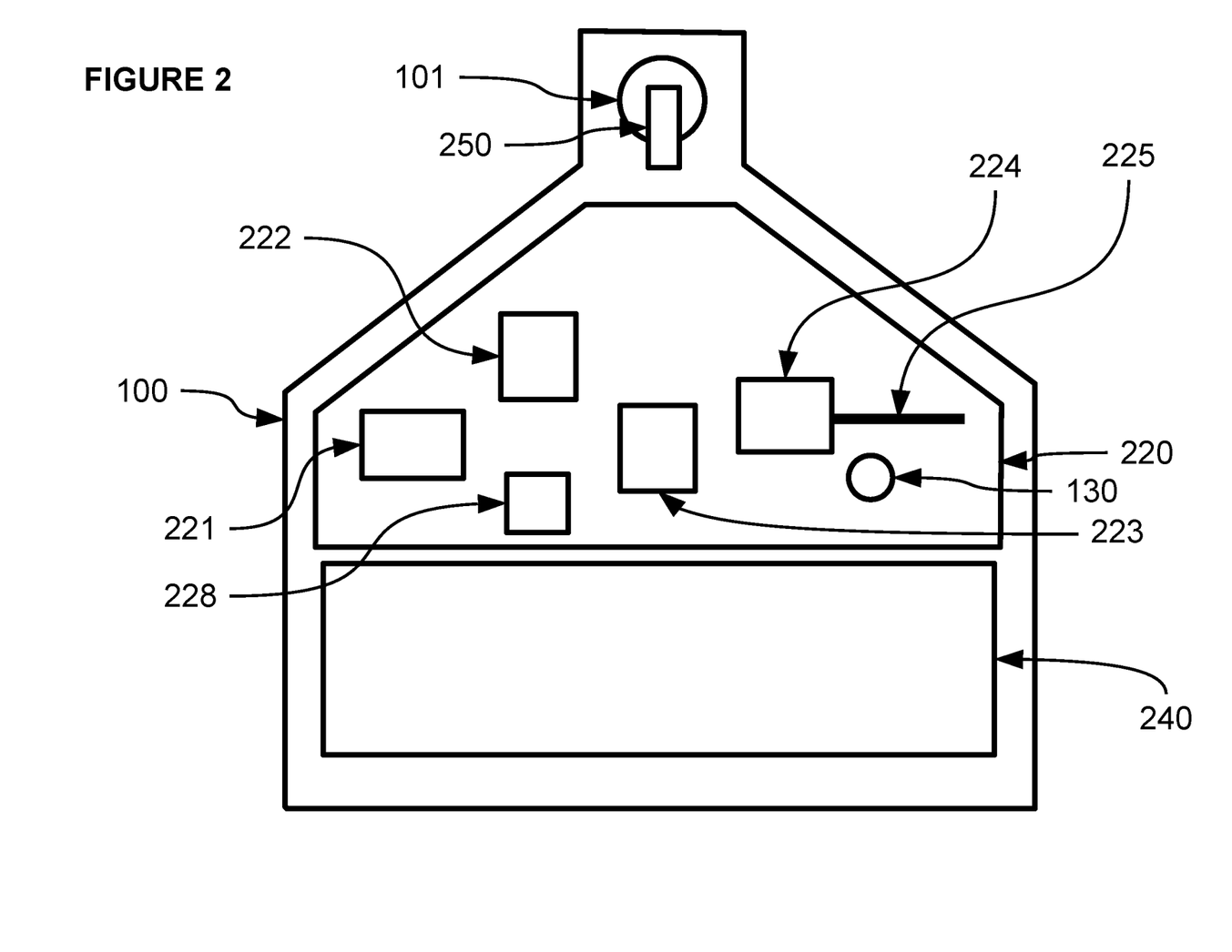
FIG. 2 is an internal cutaway view of the transmitting tag of FIG. 1.

Turning to FIGS. 1 and 2, a Transmitting Tag 100 constructed in accordance with an embodiment of the invention is illustrated. Specifically, FIG. 1 is a front view of the Transmitting Tag 100 attached to an Animal 180 that is to be tracked. FIG. 2 is an internal view of the Transmitting Tag 100.

The Transmitting Tag 100 is configured as an ear tag for Animal 180 and comprises Ear Attachment Hole 101 and Visual Identification Information 120. The front face of Transmitting Tag 100 therefore looks similar to a standard ear tag identifier for an animal. Ear Attachment Hole 101 can receive a pin (not shown) to attach Transmitting Tag 100 to the ear of Animal 180. Visual identification information 120 allows someone near Transmitting Tag 100 to identify Animal 180 visually. LED 130 provides a visual indication of an alarm state (e.g., turn on or blink as a result of a positive alarm status) on the Transmitting Tag 100, thus making it easier to identify a sick animal in the midst of a large number of animals.

Various internal components of the Transmitting Tag 100 are visible in FIG. 2. Battery 240 is coupled to Circuit Board 220 via wires (not shown). Circuit Board 220 comprises passive RFID Module 221, Motion Sensor 222, Controller 223, Hall sensor 228, LED 130, and LoRa transceiver 224. LoRa transceiver 224 comprises Antenna 225. Controller 223 may comprise a voltage sensor (not shown).

Temperature sensor 250 may be positioned in ear attachment hole 101 and may be configured to be electrically coupled to Circuit Board 220. Alternatively, temperature sensor 250 may be configured to be located on Circuit Board 220 rather than going inside ear attachment hole 101. Temperature sensor 250 may also be configured to not consume power except when a reading is being taken (such as, for example, a few milliseconds every 15 minutes).

Temperature Sensor 250 may be awakened for a duration of less than 10 milliseconds at a first regular interval greater than 1 minute for extraction of digital information. Temperature Sensor 250 may not draw any power except during the 10 millisecond period during which it is being read. The digital information from Temperature Sensor 250 may be stored in memory of the Transmitting Tag 100. A positive alarm status may be produced when a temperature measured by Temperature Sensor 250 is or increases above a predetermined threshold. Alarm status may be modified according to ambient temperature such that a higher ambient temperature increases a threshold for a frequency of detection of close proximity required to produce a negative status.

Motion Sensor 222 may comprise a small metal ball inside a cylinder configured to complete an electrical circuit by rolling to one end when the cylinder is tipped, thereby detecting motion. Motion Sensor 222 may be configured to consume only a few (e.g. less than 50 or less than 100) micro amperes of current in normal operation. When motion is detected via the metal ball, Motion Sensor 222 increments a counter. Motion Sensor 222 may detect a first quantity of motion of the animal and store first quantity of motion information in memory of the Transmitting Tag 100. Alarm status may be determined according to the frequency of detection of motion or the quantity of motion.

Passive RFID Module 221 is configured to be energized by an appropriately configured RFID transmitter (not shown). Passive RFID Module 221 is configured to consume no power from Battery 240. Passive RFID Module 221 remains in an inactive state most of the time. When Transmitting Tag 100 comes into the near vicinity (e.g. 3 meters) of the RFID transmitter, the nearby RFID transmitter energizes Passive RFID Module 221 so that Transmitting Tag 100 can record the nearby presence of the appropriately configured RFID transmitter. The distance over which Passive RFID Module 221 is energized by the RFID Transmitter will vary with the type of antenna used inside the RFID Transmitter and may for example vary from 3 meters for a patch antenna to 10-30 centimeters for a leaky feeder antenna.

Controller 223 comprises a memory module and is configured to be electrically coupled to Temperature Sensor 250, Battery 240, Passive RFID Module 221, Motions Sensor 222, and LoRa transceiver 224. Controller 223 is configured to operate in a sleep mode most of the time and awaken in accordance with a timer or an input voltage crossing a threshold. For example, Controller 223 may be configured to operate in a sleep mode but awaken for very short periods of time (e.g. 2 seconds) once every 15 minutes. Controller 223 may be further configured to awaken for a short period (less than 1 second) in response to a voltage present from Passive RFID Module 221 or Motion Sensor 222. Controller 223 may further be configured sometimes to read and record the voltage across Battery 240 when it awakes from sleep mode (for example once per day hour). A positive alarm status may result from a voltage below a predetermined threshold.

Figure 3:
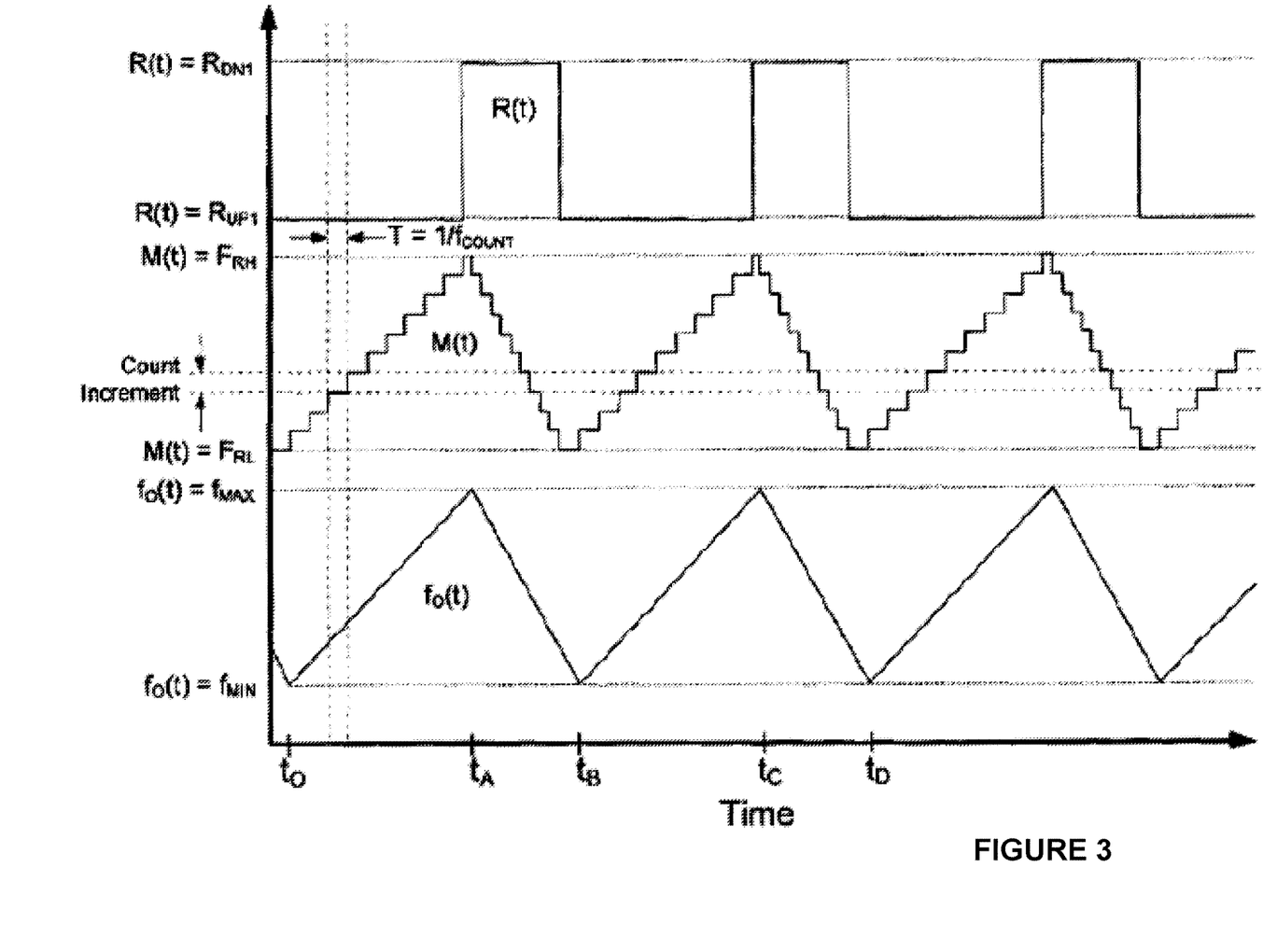
FIG. 3 is a graphical representation of an example frequency modulation scheme used in a LoRa transmitter in accordance with an embodiment of the invention.

LoRa transceiver 224 (a LoRa transmitter and LoRa receiver combination) uses LoRa technology to allow low-power transmission over long distances such as 1 kilometer. Standard transmission technologies use frequency-shift keying to transmit digital bits of information—that is, a transmission frequency is modulated into a single upper frequency or a single lower frequency to represent a binary 0 or 1 to be decoded by a receiver. In contrast, LoRa technology uses a fractional-N phase-locked-loop to allow a modulated frequency that differs in up-frequency rate from down-frequency rate with great accuracy. FIG. 3 illustrates typical waveforms for a LoRa transmitter. The top plot in FIG. 3 shows a binary waveform representing a binary 0 or a binary 1, corresponding to the desired bit to be transmitted, in which a binary 0 corresponds to a frequency up-rate and a binary 1 corresponds to a frequency down-rate. The center waveform in FIG. 3 corresponds to a digital multiplier inside the fractional-N phase-locked loop of the LoRa transceiver. The bottom plot in FIG. 3 corresponds to the frequency produced by the LoRa transmitter as a result of the changing digital multiplier. The frequency shown in the bottom plot of FIG. 3 is a smoothed version of the stair-step waveform of the middle plot of FIG. 3. Smoothing occurs due to a randomization of frequency at a frequency substantially higher than the low-pass filter of the phase-locked loop in the LoRa transmitter.

The LoRa transceiver 224 may transmit at a first set of frequencies on a first set of channels and at a second set of frequencies on a second set of channels. The frequencies and channels being transmitted on may depend on alarm status. It is advantageous to change the set of transmission frequencies based on alarm status to allow for greater information bandwidth when there is a positive alarm status.

The LoRa Transceiver 224 determines whether the transmission frequency is increasing or decreasing corresponding to a respective assignment of a binary 0 or 1 to the transmission string. Measurement of frequency ramp direction (LoRa technology) as opposed to measurement of frequency change (standard technologies) allows resolution of signals with much lower power levels. Use of LoRa technology typically increases signal resolution by 30 dB. This increase in signal resolution and associated decrease in required signal power enables use of a small battery 240 which has a weight small enough to be used in an ear tag that is not too heavy for use with an animal. Furthermore, the increase in signal resolution allows transmission over long distances (such as 1 kilometer) when coupled with an adequately low-weight battery, thus enabling the Transmitting Tag 100 to transmit information to a base station which is far enough away to be used in most typical grazing scenarios for animals wearing transmitting tags.

LoRa Transceiver 224 also conserves power when not transmitting. Quiescent current when the LoRa Transceiver 224 is not transmitting is typically on the order of 10 microamperes or less. The low quiescent current of the LoRa Transceiver 224 enables use of low-energy storage power sources. The LoRa transceiver 224 may also be configured to enter a non-transmitting sleep mode for predetermined periods of time, which may be based on alarm status. For example, the LoRa transceiver 224 may enter a non-transmitting sleep mode for a first period of more than 1 hour for a negative alarm status and less than 1 hour for a positive alarm status.

LoRa Transceiver 224 may further comprise a GNSS receiver which is configured to determine relative timing of transmissions/signals from GNSS satellites with adequate accuracy to provide absolute position information of Transmitting Tag 100. Information related to timing and digital content of the GNSS satellite transmissions/signals may be forwarded to a remote server.

Hall Sensor 228 may be configured to sense presence of a nearby permanent magnet (not shown) and, in response, reset an alarm condition (e.g., from a positive alarm state to a negative alarm state) of Transmitting Tag 100. Note that the function of Hall Sensor 228 with an external permanent magnet (not shown) could be replaced by a button (not shown) that is used to reset an alarm condition of Transmitting Tag 100 by being pressed.

Figure 4:
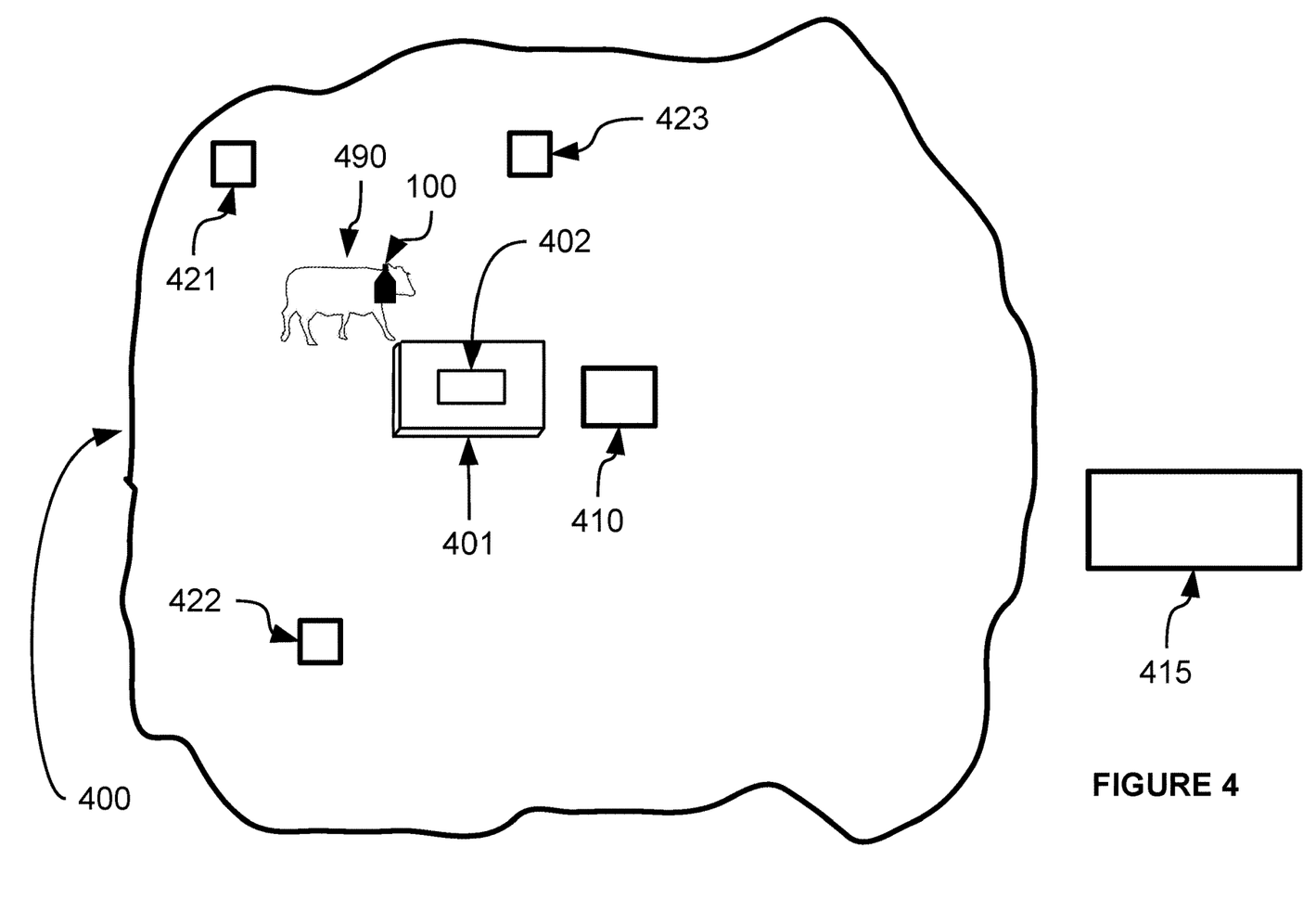
FIG. 4 is an environmental view of a tracking system in accordance with an embodiment of the invention.
Figure 5:
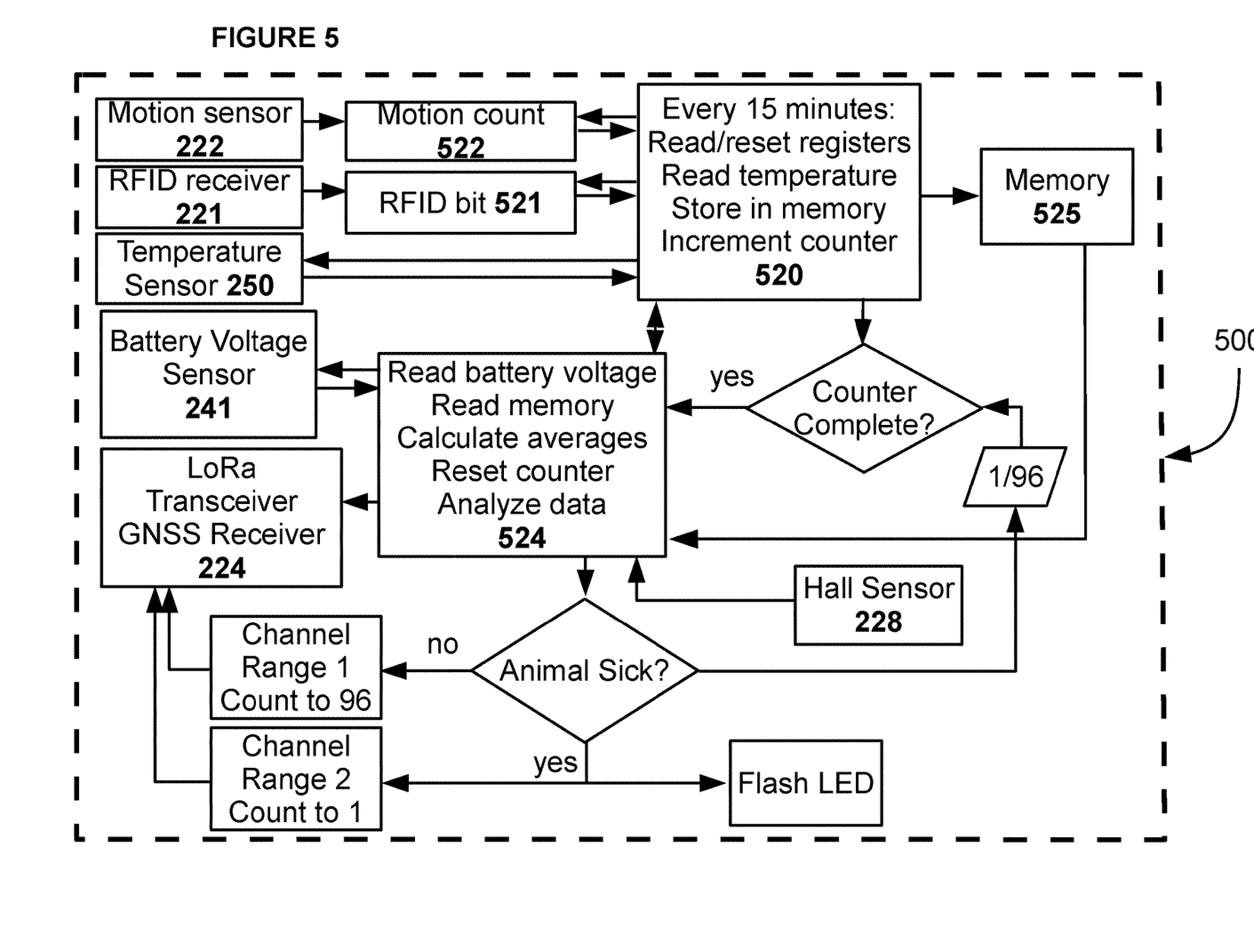
FIG. 5 is a block diagram of a control technique for a tracking system constructed in accordance with an embodiment of the invention.

FIG. 4 illustrates an embodiment of a cattle tracking system that comprises cattle Transmitting tag 100, and FIG. 5 illustrates a block diagram of a control technique for Transmitting Tag 100. In FIG. 4, Ranch 400 comprises Water Trough 401, Gateway 410, and Repeaters 421, 422, and 423. Water Trough 401 comprises RFID Transmitter 402. Animal 490 located on Ranch 400 is wearing Transmitting Tag 100. Server 415 may be located remotely from Ranch 400 and coupled to Gateway 410 through an internet connection (not shown). RFID Transmitter 402 is suspended over Water Trough 401 in such a way that Passive RFID Module 221 in Transmitting Tag 100 will awaken and log an input only when Animal 490 has its head above Water Trough 401 and is close enough to be drinking water from it.

The antenna (not shown) inside RFID Transmitter 402 may be a standard patch antenna that allows Passive RFID Module 221 to awaken and log an input if RFID Transmitter 402 is within about 3 meters of Passive RFID Module 221. In such a case, RFID Transmitter 402 may be suspended about 3 meters above Water Trough 401 so that Animal 490 must have its head over Water Trough 401 to trigger operation of Passive RFID Module 221. The use of a patch antenna will work if the Water Trough 401 is relatively small such as 1 meter long. For cases in which Water Trough 401 is longer (in the range of several meters long), RFID Transmitter 402 can use a leaky feeder antenna (not shown). A leaky feeder antenna may be constructed out of a coaxial cable with evenly spaced slots cut in it. Each slot acts as a radiator. The range of a leaky feeder antenna is much shorter than that of a patch antenna. A leaky feeder antenna may have a range on the order of 10 cm to 30 cm; however, the leaky feeder antenna can have a length equal to that of Water Trough 401. A leaky feeder antenna, if used as part of RFID Transmitter 402 may therefore be located at a much lower height than a patch antenna so that Animal 490 may still have to place its head close enough to the water to drink in order to awaken Passive RFID Module 221. Other antenna structures may be used, such as helical antennas. Importantly, the antenna is placed at a height that requires animal 490 to have its head in place to drink water in order to awaken Passive RFID Module 221. Thus, operation of Passive RFID Module 221 presents an accurate indication that Animal 490 has taken a drink of water.

Gateway 410 may be a high-throughput LoRa gateway which may have 64 channels available for receiving data.

Repeaters 421, 422, and 423 may be low-throughput LoRa receivers configured to have only 8 channels. Gateway 410 is configured to receive data from Transmitting Tags attached to several animals on the ranch, and thus may receive tens of thousands of signals per hour when the ranch houses tens of thousands of animals. Gateway 410 may therefore be an expensive piece of hardware and may cost on the order of 2500 USD. Repeaters 421, 422, and 423 are configured to only receive data from Transmitting Tags of animals that are presumed to be sick, and thus receive far less traffic than Gateway 410. Repeaters 421, 422, and 423 can thus be configured to operate at significantly lower throughput than Gateway 410 and can therefore be designed at much lower cost, on the order of 150 USD. The use of multiple receivers (Repeaters 421, 422, and 423) allows the use of trilateration based on signal strength to determine approximate location of the particular Transmitting Tag producing the signal. Since multiple receivers are needed to estimate position using trilateration, it is critical that the cost of the receivers be much lower than the cost of high-throughput gateway 410.

Transmitting Tag 100 may be configured to choose between transmitting information on channels corresponding to Gateway 410 or on channels corresponding to Repeaters 421, 422, and 423 in response to determination of the animal's state of health. Transmitting Tag 100 may include digital storage of two sets of encryption keys with one set of encryption keys being used to transmit information on one set of channels and the other set of encryption keys being used to transmit information on the other set of channels.

Gateway 410 may be configured to send information to Server 415 via an internet connection (not shown). Server 415 may be configured to log information from Transmitting Tags (such as Transmitting Tag 100) attached to cattle on Ranch 400. Server 415 may be configured to determine location from Transmitting Tag 100 either by using trilateration based on signal strength from Repeaters 421, 422, and 423, or by using GNSS information received from Transmitting Tag 100.

FIG. 5 is a system control flow diagram for the system illustrated in FIG. 4 for a case in which location is determined using GNSS information received from Transmitting Tag 100. Control Block 500 illustrates some control elements of Transmitting Tag 100. Motion Sensor 222 wakes up in response to motion from Tag 100 and increments a motion count 522. Passive RFID receiver 221 is energized when Tag 100 is close to RFID Transmitter 402 in Water Trough 401 and then sets an RFID Bit 521 to a 1. Controller 223 is configured to be in sleep mode most of the time.

As shown in Block 520, every 15 minutes, Controller 223 awakens to perform several functions:
  It reads RFID Bit 521, resets RFID Bit 521 to 0 and adds a 1 to the RFID Count in Memory 525.
  It reads Motion Count 522, resets Motion count 522 to 0, and stores the value in Memory 525.
  It momentarily energizes Temperature Sensor 250, reads the temperature, and stores the value in Memory 525.
  It increments an internal counter.

If, during the previous control cycle, the animal is determined to not be sick, then when the internal counter reaches 96 (in other words, once per day), the steps in Block 524 are implemented: the voltage is read from Battery Sensor 241, the values of RFID count, Motion count, and Temperature are read from Memory 525. The average values of motion and RFID are calculated, Memory 525 is reset, and the internal counter of Block 520 is reset (to ensure that Block 524 is executed once per day). The data is then analyzed to determine whether or not the animal is sick.

The determination of whether or not the animal is sick may for example include comparison of the average RFID count (i.e. the number of times the animal drank water) to former averaged values of RFID count. The average value of RFID count may further be adjusted for temperature since the animal is expected to drink more water when the ambient temperature is higher. The determination of whether or not the animal is sick may also include comparison of the average motion count to former averaged values of motion count.

If the animal is determined to be sick (i.e. the tag is set to an alarm state), then the counter limit is set to 1 instead of 96 (causing the transmission cycle to occur every 15 minutes instead of once per day), the channel range is set to channel range 2, and the LED is set to a flashing state. If the animal is determined to not be sick, then the channel range is set to channel range 1 and the counter limit remains at 96.

LoRa Transceiver 224 reads GNSS signals and transmits the average motion count, average RFID count, GNSS information, temperature, and voltage values to a remote server. The remote server logs the information sent to it along with the time that the signal is received and the calculated position based on GNSS information. In the case in which trilateration is used instead of GNSS information to determine location, the remote server may log information from Repeaters 421, 422, and 423 and use the reported RSSI signal strengths to trilaterate a position of Transmitting Tag 100.

Thus, an embodiment of a system has been presented which allows for use of very low power tags that can record vital sensor data, operate from a lightweight battery, and provide animal location information for sick animals while employing only a single high-throughput gateway along with multiple low-throughput gateways or repeaters.

Other effective alternatives may include, for example, elements used for storing information in the tag could be part of many different components such as the Passive RFID Module 221, the Motion Sensor 222, or the Controller 223. Additional sensors could be added to the ranch such as an RFID transmitter positioned in the feed lot and configured so that the Passive RFID receiver in the tag can distinguish between the RFID transmitter in the feed lot and the RFID transmitter in the water trough.

Those skilled in the art should understand that the previously described embodiments of the cattle tracking system and related methods of operating the same are submitted for illustrative purposes only.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An animal tracking system comprising:
   a first LoRa receiver configured as a gateway to receive transmissions on at least one of a first set of channels and a second set of channels and forward said transmissions to a remote server;
   a first RFID transmitter configured to be positioned near an animal watering apparatus; and
   a transmitting tag configured to be affixed to an animal, the transmitting tag comprising:
      a memory configured to store digital information;
      a first passive RFID receiver configured to detect a first close proximity to a first RFID transmitter and store detection of the first close proximity in the memory;
      a processor configured to determine an alarm status according to a frequency of detection of the first close proximity;
      an internal energy source; and
      a LoRa transmitter configured to transmit signals for a distance greater than 100 meters via energy from the internal energy source and to enter a non-transmitting sleep mode for a first period of more than 1 hour for a negative alarm status and less than 1 hour for a positive alarm status;
   the first RFID transmitter being configured to awaken the first passive RFID receiver when the animal is close enough to drink water from the animal watering apparatus so that the first passive RFID receiver stores detection of the first close proximity to the first RFID transmitter in the memory.

2. The animal tracking system of claim 1, wherein the LoRa transmitter is further configured to transmit at a set of frequencies on either the first set of channels or the second set of channels depending on the alarm status.

3. The animal tracking system of claim 1, wherein the internal energy source comprises a photovoltaic cell.

4. The animal tracking system of claim 1, wherein the transmitting tag further comprises a temperature sensor, the processor is configured to awaken the temperature sensor for a duration of less than 10 milliseconds at a first regular interval greater than 1 minute to read digital information from the temperature sensor, the temperature sensor is configured to not draw any power except during the 10 millisecond period during which it is being read, and the processor is further configured to store the digital information from the temperature sensor in the memory.

5. The animal tracking system of claim 4, wherein the determination of the alarm status is modified according to ambient temperature such that a higher ambient temperature increases a threshold for the frequency of detection of the first close proximity required to produce a negative alarm status.

6. The animal tracking system of claim 1, wherein the transmitting tag further comprises a motion sensor configured to draw less than 100 micro amperes of current and detect a first quantity of motion of the animal and store first quantity of motion information in the memory, the processor being further configured to determine an alarm status according to the frequency of detection of motion.

7. The animal tracking system of claim 6, wherein the processor is configured to determine an alarm status by comparing the quantity of motion to older values of the quantity of motion.

8. The animal tracking system of claim 1, wherein the transmitting tag further comprises an LED configured to turn on as a result of a positive alarm status.

9. The animal tracking system of claim 1, wherein the processor is further configured to read a voltage of the internal power source, and wherein the alarm has a positive status when the voltage is below a predetermined threshold.

10. The animal tracking system of claim 1, wherein the RFID transmitter comprises a leaky feeder antenna.

11. The animal tracking system of claim 1, wherein the transmitting tag comprises digital storage of two sets of encryption keys, a first one of the two sets of encryption keys being used to transmit information on the first set of channels, and a second one of the two sets of encryption keys being used to transmit information on the second set of channels.

12. The animal tracking system of claim 1, further comprising the remote server, wherein the remote server is configured to receive information from the transmitting tag through the gateway.

13. The animal tracking system of claim 12, wherein the transmitting tag further comprises a GNSS receiver configured to receive GNSS satellite signals and forward information related to timing and digital content of said GNSS satellite signals to the remote server.

14. The animal tracking system of claim 12, further comprising second and third LoRa receivers configured to receive transmissions from the transmitting tag and to forward said transmissions to the remote server, wherein the remote server is configured to calculate position of the transmitting tag based on signal strength of the signals going to the first, second, and third LoRa receivers.

15. The animal tracking system of claim 1, wherein the transmitting tag further comprises a hall effect sensor coupled to the processor and the processor is configured to change the tag from a positive alarm state to a negative alarm state when the hall effect sensor is placed near a permanent magnet.

16. The animal tracking system of claim 1, wherein the processor is configured to determine an alarm status by comparing the frequency of detection of a first close proximity to older values of the frequency of detection of the first close proximity.

17. The animal tracking system of claim 1, wherein the transmitting tag further comprises a button coupled to the processor and the processor is configured to change the transmitting tag from a positive alarm state to a negative alarm state when the button is pressed.

18. The animal tracking system of claim 1, further comprising a second RFID transmitter configured to be positioned in an animal feed lot and configured to awaken the first passive RFID receiver when the animal is close enough to eat from the animal feed lot, the first passive receiver being further configured to distinguish between the first RFID transmitter and the second RFID transmitter.

19. An animal tracking system comprising:
   a first LoRa receiver configured as a gateway to receive transmissions on at least one of a first set of channels and a second set of channels and forward said transmissions to a remote server;
   a first RFID transmitter configured to be positioned near an animal watering apparatus; and
   a transmitting tag configured to be affixed to an animal, the transmitting tag comprising:
      a memory configured to store digital information;

a first passive RFID receiver configured to detect a first close proximity to a first RFID transmitter and store detection of the first close proximity in the memory;

a processor configured to determine an alarm status according to a frequency of detection of the first close proximity;

an internal energy source;

a LoRa transmitter configured to transmit signals for a distance greater than 100 meters via energy from the internal energy source; and a temperature sensor, the processor being further configured to awaken the temperature sensor for a duration of less than 10 milliseconds at a first regular interval greater than 1 minute to read digital information from the temperature sensor, the temperature sensor being configured to not draw any power except during the 10 millisecond period during which the temperature sensor is being read, the processor being further configured to store the digital information from the temperature sensor in the memory and modify the determination of the alarm status according to ambient temperature such that a higher ambient temperature increases a threshold for the frequency of detection of the first close proximity required to produce a negative alarm status;

the first RFID transmitter being configured to awaken the first passive RFID receiver when the animal is close enough to drink water from the animal watering apparatus so that the first passive RFID receiver stores detection of the first close proximity to the first RFID transmitter in the memory.

20. The animal tracking system of claim 19, wherein the processor is configured to produce a positive alarm status when the temperature increases above a predetermined threshold.

* * * * *